(12) United States Patent
Sparks et al.

(10) Patent No.: US 7,160,930 B2
(45) Date of Patent: Jan. 9, 2007

(54) WATER BLOWN POLYURETHANE SPRAY FOAM SYSTEM

(75) Inventors: Thomas A. Sparks, Spring, TX (US); Philip D. Harkins, Houston, TX (US); Ray J. Anderson, Spring, TX (US)

(73) Assignee: Baysystems North America LLC, Pittsburgh, PA (US)

( * ) Notice: Subject to any disclaimer, the term of this patent is extended or adjusted under 35 U.S.C. 154(b) by 247 days.

(21) Appl. No.: 10/890,672

(22) Filed: Jul. 14, 2004

(65) Prior Publication Data

US 2006/0014846 A1 Jan. 19, 2006

(51) Int. Cl.
*C08G 18/22* (2006.01)

(52) U.S. Cl. ............ 521/125; 521/131; 521/164; 521/167; 521/173; 521/902; 521/125

(58) Field of Classification Search ......... 521/125, 521/131, 164, 167, 173, 902
See application file for complete search history.

(56) References Cited

U.S. PATENT DOCUMENTS

| | | | |
|---|---|---|---|
| 4,489,178 A | | 12/1984 | Brennan et al. |
| 4,575,520 A | | 3/1986 | Kapps et al. |
| 4,760,100 A | * | 7/1988 | McDaniel .............. 521/137 |
| 5,306,735 A | | 4/1994 | Harada et al. |
| 5,407,967 A | | 4/1995 | Williams et al. |
| 5,451,615 A | | 9/1995 | Birch |
| 5,464,561 A | | 11/1995 | Williams et al. |
| 6,066,681 A | | 5/2000 | Kaplan et al. |
| 6,211,257 B1 | | 4/2001 | Kaplan et al. |
| 6,495,722 B1 | | 12/2002 | Zimmerman et al. |
| 2001/0014387 A1 | | 8/2001 | Giampaolo |
| 2002/0040122 A1 | | 4/2002 | Mirasol et al. |
| 2003/0225165 A1 | * | 12/2003 | Wu et al. ............... 516/10 |
| 2003/0225174 A1 | | 12/2003 | Albach et al. |

OTHER PUBLICATIONS

Klempner et al.; Polymeric Foams; 1991; pp. 76-82.*
Akira Naruse, Development of All Water-Blown Polyisocyanurate Foam System for Metal-Faced Continuous Sandwich Panels, J. Cellular Plastics, 38, pp. 385-401;(2002).
Guideline for Insulating Metal Buildings with Spray Applied Polyurethane Foam; Spray Polyurethane Foam Alliance, AY-134, (2002).
Mason Knowles, Sustainability Characteristics of SPF Roofing and Insulation Systems; Modern Materials Magazine, pp. 1-7 (2003).

* cited by examiner

*Primary Examiner*—Rachel Gorr
(74) *Attorney, Agent, or Firm*—Joseph C. Gil; Lyndanne M. Whalen

(57) ABSTRACT

A composition and a method for producing primarily water blown polyurethane foams is provided. The composition uses isocyanate ratios greater than conventional foam system to provide a water blown polyurethane foam suitable for a wide variety of applications including spray roofing, insulation, etc. The preferred composition for preparing a polyurethane foam comprises an isocyanate component and a polyol component, wherein the polyol component preferably comprises a combination of Mannich polyol, polyester polyol, and polyether polyol. Preferably, the composition includes water to act as a blowing agent and a metal salt catalyst to assist in the reaction. Preferably, the isocyanate index is between about 1.2 and about 2.0. Additional catalysts, surfactants, flame retardants, and blowing agents may also be used depending upon the desired finished product.

48 Claims, No Drawings

WATER BLOWN POLYURETHANE SPRAY FOAM SYSTEM

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention relates to compositions and methods for preparing polyurethane foams. In one aspect, the invention relates to compositions and methods for preparing water blown polyurethane spray foams. In another aspect, the invention relates to a method of applying water blown polyurethane foams.

2. Description of the Related Art

Building owners have used spray polyurethane foam as a roofing, insulation, and sealing product for many years. However, environmental concerns have prevented the continued use of conventional spray polyurethane foam formulations. In particular, the blowing agents used in conventional formulations to form spray polyurethane foams have come under increased regulation and in many cases, outright prohibition.

The Montreal Protocol of 1987 set forth progressive stages of change aimed at protecting the earth's upper ozone layer by reducing the amount of chlorine in the atmosphere. A significant portion of the chlorine is attributed to chlorinated blowing agents that are used in polyurethane foams. The United States Environmental Protection Agency (EPA) periodically approves new blowing agents containing lower amounts of chlorine and discontinues (bans) previously approved blowing agents.

As part of this protocol on Jan. 1, 1993, the polyurethane industry was required to change from the conventional blowing agent CFC-11 to HCFC-141b. The change from CFC-11 to HCFC-141b was not excessively difficult for the polyurethane industry because there were several commercial manufacturers of HCFC-141b and its cost was only slightly greater than CFC-11.

Currently, the polyurethane industry is being required to change from HCFC-141b. The suggested blowing agents are now HFC-245fa, hydrocarbons (pentanes) and others. This transition is much more of a challenge in part because HFC-245fa boils at approximately 60° F. compared to HCFC-141b boiling point of approximately 89° F. Since the 60° F. boiling point is below most ambient conditions, HFC-245fa creates pressure problems for materials shipped in the steel or plastic containers (drums and totes) that have commonly been used in the past with CFC-11 and HCFC-141b systems. Most spray polyurethane system formulators have attempted to use HFC-245fa and water as co-blowing agents to keep from having to use pressure cylinders to store and ship product.

In addition to pressure problems, HFC-245fa costs more than four times HCFC-141b in the United States. There is only one supplier of HFC-245fa and only one supplier of that manufacturer's supplier of base material with which to make the HFC-245fa. The additional cost represents a much higher cash flow requirement for most small business formulators to purchase needed amounts of the HFC-245fa. For the spray polyurethane foam roofing industry, the additional cost adversely affects the competitiveness of the spray polyurethane foam versus other roofing products on a cost basis.

Even more of a challenge is the attempt to use hydrocarbons. These compounds are highly flammable and have specific explosive properties. This is not to say hydrocarbons cannot be used to produce spray and pour polyurethane and polyisocyanurate foam systems, but significant expenditures in equipment and training must accompany any attempt by the contractor or OEM manufacturer to be able to use these compounds. In the sprayfoam industry, most systems suppliers and contractors have chosen not to work with these materials due to their hazardous nature and potential downstream liability.

The use of water in polyurethane foam forming compositions is not new. In fact, almost all polyurethane foam formulations have some water content either purposely added or as a minor trace component in the raw materials used. Water becomes a blowing agent by reacting with the isocyanate in the foam system. This reaction produces carbon dioxide as a by-product. The carbon dioxide is a gas and expands due to the heat of reaction of the foam system. The blowing agent is required to create the cellular nature of the foam structure and to help control the applied density of the foam.

Spray and pour polyurethane foam systems have traditionally minimized the use of water as a blowing agent due to adequate supplies of CFC or HCFC foaming agents being available at reasonable cost. The high cost of HFC-245fa and technical limitations associated with HFC-245fa and other potential blowing agents have initiated more efforts in the use of water. Using water, however, in place of HCFC or HFC blowing agents is not straight forward.

Water is a reactive blowing agent in polyurethane foam systems whereas CFC, HCFC, and HFC compounds are not reactive. Because water consumes a large amount of isocyanate (about 9 pounds of water will react with 134 pounds of isocyanate), a system is limited on the amount of water that can be used. In polyurethane foam systems, the isocyanate reacts with the polyol components to form the polymer structure. The isocyanate reacts with the water to cause the foam matrix. The isocyanate and the components that react with the isocyanate must be chemically, stoichiometrically, balanced to assure a complete reaction of the components. In practice, polyurethane systems are formulated with a small excess of isocyanate to assure complete reaction. This parameter is referred to as isocyanate index or simply "NCO index." Commonly, polyurethane foams are designed in a NCO index range of 1.05–1.20. The NCO index is fixed and designed into the liquid system when it is produced. It is not readily controllable in the end-use application. The amount of isocyanate in spray polyurethane foam formulations is normally limited in use by industry standard application equipment which is a 1:1 (A:B) by volume ratio.

One attempt to provide a water blown polyurethane foam forming composition is found in U.S. Patent Application Publication No. U.S. 2002/0040122A1 to Mirasol, et al., now abandoned. Mirasol stated that the use of conventional Mannich polyols in water blown systems could cause equipment failure and other processing difficulties. Mirasol also stated that foams prepared using conventional Mannich polyols and water as a blowing agent can have coarse cell structure, rough skin surface, poor dimensional stability, poor flame retardancy, and poor substrate adhesion. Additionally, Mirasol stated that the combination of water and Mannich polyols could create formulations which have too high viscosity and could cause problems in some kinds of foam making equipment. In part, Mirasol recognized that a disadvantage of water as a blowing agent in polyol formulations is that water does not reduce the viscosity of Mannich polyols as effectively as halocarbon blowing agents. In an attempt to overcome these problems, Mirasol provided a B-side component that included an ultra low viscosity Mannich polyol having a viscosity of less than 3,500 centipoise (cps) at 25° C., along with a second polyol that included Mannich polyols having viscosity greater than 3,500 cps at 25° C., Novolac polyols, and other aromatic group containing polyols. Mirasol provided for only minor amounts of other polyols in its formulation. In general, the low viscoscity Mannich polyols have the characteristic of producing foams that are much slower to cure and reach adequate firmness. In spray formulations these characteristics are detrimental during application.

There remains a need for a polyurethane foam forming composition that does not rely on a halocarbon blowing agent. Additionally, there is a need for a water blown polyurethane spray foam having equivalent or better properties compared to conventional halocarbon blown foams. Further, there is a need for a polyurethane foam formulation that can use more readily available polyols, including readily available, conventional Mannich polyols, yet still produce superior polyurethane foam when using water as a blowing agent.

BRIEF SUMMARY OF THE INVENTION

The present invention includes a composition and a method for producing a primarily water blown polyurethane foam. The present invention uses a unique combination of components and isocyanate ratios greater than conventional systems to provide a water blown polyurethane foam suitable for a wide variety of applications including spray roofing, insulation, etc.

The preferred composition for preparing a polyurethane foam comprises an isocyanate component and a polyol component, wherein the polyol component preferably comprises a combination of Mannich polyol, polyester polyol, and polyether polyol. Preferably, the composition includes water to act as a blowing agent and a metal salt catalyst to assist in the reaction. Preferably, the isocyanate index is between about 1.2 and about 2.0. Additional catalysts, surfactants, flame retardants, and blowing agents may also be used depending upon the desired finished product.

DETAILED DESCRIPTION OF THE INVENTION

A-Side Component

The polyisocyanate A-side component of the formulations of the present invention preferably include those as are known to those of skill in the art, and it is not intended that the A-side component be limited to those specifically illustrated herein. For example, the polyisocyanate A-side component of the formulations of the present invention can be advantageously selected from organic polyisocyanates, modified polyisocyanates, isocyanate-based prepolymers, and mixtures thereof. These can include aliphatic and cycloaliphatic isocyanates, but aromatic and especially multifunctional aromatic isocyanates are preferred, and polyphenyl polymethylene polyisocyanates (PMDI) is most preferred. Commercially available PMDI products such as are preferred include Mondur® MR Lite from Bayer Corporation, Rubinate® M from Huntsman Corporation, and the like.

PMDI in any of its forms is the most preferred polyisocyanate for use with the present invention. When used, it preferably has an equivalent weight between about 125 and about 300, more preferably from about 130 to about 180, and an average functionality of greater than about 1.5. More preferred is an average functionality of from about 2.0 to about 3.0. The viscosity of the polyisocyanate component is preferably from about 100 to about 1,000 cps, but values from about 100 to about 500 cps at 25° C. are preferred for ease of processing. Similar viscosities are preferred where alternative polyisocyanate components are selected. Still, preferably, the polyisocyanate component of the formulations of the present invention is selected from the group of MDI, PMDI, an MDI prepolymer, a PMDI prepolymer, a modified MDI and mixtures thereof.

B-Side Component

Generally, the B-side component comprises one or more Mannich polyols, one or more polyester polyols, and one or more polyether polyols. Additionally, the B-side component preferably includes water as a blowing agent and metal salt catalyst to assist in the reaction. Additional catalysts, surfactants, flame retardants, and auxiliary blowing agents may also be used.

In the practice of the present invention, the B-side component will preferably comprise in the range of about 10 to about 50 weight percent Mannich polyol, in the range of about 10 to about 80 weight percent polyester polyol and in the range of about 10 to about 50 weight percentage polyether polyol. More preferably, the B-side component will comprise in the range of about 15 to about 45 weight percent Mannich polyol, in the range of about 15 to about 75 weight percent polyester polyol, and in the range of about 15 to about 45 weight percentage polyether polyol. Most preferably the B-side component will comprise in the range of about 20 to about 40 weight percent Mannich polyol, in the range of about 20 to about 40 weight percent polyester polyol, and in the range of about 20 to about 40 weight percentage polyether polyol.

In the method of making the B-side component, the Mannich polyol, the polyester polyol, and the polyether polyol are contacted together using any suitable method and apparatus as are known to those of skill in the art for combining polyols.

In the practice of the present invention, the B-side component may comprise only one, or even a mixture of Mannich polyols. Mannich poylols are well known in the art and are well suited for adding strength to the urethane polymer structure. Preferably, the polyurethane foam formulation B-side component includes a Mannich polyol having functionality equal to or greater than 3.0, viscosity greater than 3,500 cps but less than 40,000 cps @ 25° C. Common Mannich polyols in the industry that can be used with the present invention include those that are initiated with phenol or nonyl-phenol or other suitable phenol derivatives known to those skilled in the art. Examples of suitable commercially available Mannich polyols include Voranol® R350X, R470X and R650X from Dow Chemical, Jeffol® R350-X, R466-X and R650-X from Huntsman Corp., and the like.

Polyester polyols can also be used with the B-side component of the present invention. Polyester polyols are well known in the art and are well suited for improving fire resistance in the resulting urethane foam products. The polyester polyol component can be any polyester polyol. Preferably, the polyol has a molecular weight from about 200 to about 1,000 and a hydroxyl functionality of from about 2.0 to about 6.0. Most preferably, the molecular weight falls within the range of about 300 to about 600 and a hydroxyl functionality of from about 2.0 to about 4.0. Preferably, the polyol has a viscosity from about 1,500 to about 40,000 cps @ 25° C. Most preferably, the viscosity falls within the range of about 2,000 to about 10,000 cps @ 25° C. A variety of conventional polyester polyols may be used in the present invention. For example, polyester polyols derived from dimethylterephthalate, phthalic anhydride or polyethylene terephthalate may be used. Examples of suitable commercial available polyester polyols include Terate® 3520, 4020, 4026 from Invista, Terol® 352 from Oxid L.P., and the like.

Polyether polyols can also be used with the present invention. The polyether polyol portion of the B-side component can be any polyglycol polyether polyol. The polyether polyols are primarily used to balance the NCO Index of the system. Lower functionality polyether polyols may be used to adjust viscosity while higher functionality polyether polyols may be used to add additional mechanical strength to the polymer. Preferably, the polyether polyol has a molecular weight from about 200 to about 7,000 and a hydroxol functionality from about 2.0 to about 8.0. Most preferably, the molecular of the polyether polyol weight falls within the range of about 200 to about 1,000 and a hydroxol functionality from about 2.0 to about 7.0. Preferably, the polyether polyol has a viscosity from about 10 to about 100,000 cps @25° C., more preferably from about 10 to about 20,000 cps @ 25° C., most preferably from about 25 to 8,000 cps @ 25° C. Examples of suitable commercially available polyether polyols include polyglycols E400, E600, E1000, P2000, P4000, P241, D350 from Dow Chemical or Polioles, M3901, M9171 from Bayer Corporation, and the like.

Water is the preferred blowing agent for formulations of the present invention. In formulations useful for preparing the polyurethane foams of the present invention, water will be present at a concentration of from 0.75 to 10 weight percentage of B-side component. Preferably, water is present at from 1.0 to 6.0 weight percentage of B-side component. Even more preferably, water is present at from 2.0 to 4.0 weight percentage of B-side component.

While polyurethane foam formulations which include water as the only blowing agent are preferred embodiments of the present invention, it is also contemplated that the present invention includes formulations having minor amounts of auxiliary blowing agents as well. When an auxiliary blowing agent is used, preferably it is present between about 0.01 to 10 weight percentage of said B-side component. More preferably, the auxiliary blowing agent is present between about 0.1 to 5.0 weight percentage. For example, both water and one or more of the following materials could be used as blowing agents for the formulations of the present invention: HCFC-22, HFC-134a, HCFC-142b, HFC-245fa, dichloroethylene, hydrocarbons such as n-pentane, isopentane, cyclopentane and the like. It has been found that small amounts of such auxiliary blowing agents when used with the composition of the present invention can result in higher insulation values. It is believed that the auxiliary blowing agents when trapped within the closed cell foam produced by the composition of the present invention provide additional thermal insulation.

The B-side component preferably includes some metal salt catalyst. The metal salt catalysts, along with the excess heat of reaction, causes the residual isocyanate to react with itself to form very stable isocyanurate functionality. The metal salt catalysts are alkali metal salts of organic acids, preferably sodium or potassium salts. Metal salt catalyst is preferably present between about 0.05 to 10 weight percent. Examples of commercially available metal salt catalyst suitable for the present invention include Dabco® K-15 and Polycat® 46 from Air Products, and the like.

In addition to the above referenced components, the B-side component may also include additional catalysts, surfactants, flame retardants or other additives such as would be known to those of skill in the art. Preferably, the B-side component includes at least one amine catalyst. Commercially available amine catalysts suitable for the present invention include Polycat® 5, Polycat® 8, Polycat® 11, and Dabco® BL-11 from Air Products. Other amine catalysts can also be used. In the preferred embodiment, the amine catalyst is present between about 1.0 and about 4.0 weight percentage of the B-side component.

Surfactants such as are commercially available as LK-443 and Dabco® DC-193 from Air Products, and the like can also be used in the present invention. Preferably, surfactant is present between about 0.25 and about 2.0 weight percentage of the B-side component.

Additionally, flame retardants such as Great Lakes PHT-4 Diol, Akzo-Nobel Fyrol®PCF, and the like can be used in the B-side component of the present invention. Other flame retardants may also be acceptable. In the preferred embodiment, between about 5.0 and about 15 weight percentage flame retardant is used to meet required fire resistance standards.

Preferably, the present invention has an A:B volume ratio higher than that of conventional polyurethane foam forming compositions. Preferably, the A:B volume ratio is between about 1.05:1 and about 5:1. More preferably, the A:B volume ratio is between about 1.2:1 and about 2.5:1. Even more preferably, the A:B volume ratio is between about 1.25:1 and about 2.0:1. Most preferably the A:B volume ratio is about 1.5:1.

In order to properly process some embodiments of the present invention, the processing equipment is preferably modified from the standard 1:1, A:B ratio by volume to operate at a volume ratio higher in A, preferably 1.5:1, A:B. This is readily accomplished by changing the proportioning pumps to provide the desired ratio. Once the pump(s) are changed to the proper ratio, the new spray polyurethane foam system can be easily processed without further modification.

EXAMPLES

The following examples are provided to illustrate the present invention. The examples are not intended to limit the scope of the present invention and should not be so interpreted. Amounts are in weight parts or weight percentages unless otherwise indicated.

Example 1

A 1:1 ratio polyurethane foam forming system was prepared utilizing water as the primary foaming agent. The composition of this system is shown in Table 1. Approximately 3 parts (or parts per hundred parts of the B-side component, i.e., 3%) HFC-134a was added in addition to the water in order to make an acceptable foam density while maintaining a very marginally acceptable NCO index of 1.05. Those persons of ordinary skill in the art will recognize that other auxiliary blowing agents such as HCFC-22 may be substituted in place of HFC-134a. The foam system processed well, but thick cross sections of foam scorched internally and smoldered and/or self-ignited to create a fire. This can be especially a problem at warmer ambient temperatures which is when most of the roofing foam applications are done. The scorching/fire occurred due to the heat of reaction in the foam system. Conventional polyurethane foam 1:1 ratio systems utilizing liquid blowing agents such as CFC's, HCFC's, or HFC's volatilize these agents and thereby act as a heat sink to absorb much of the heat of reaction. This formulation failed to meet a Class II fire rating by ASTM E-84 test procedure as required for most all spray polyurethane foam roof and wall applications.

Example 2

To overcome the problem in Example 1 of the heat of reaction, Applicants experimented with off ratio, non 1:1, A:B systems. It was found the off ratio systems with an increased amount of available isocyanate (NCO index) could accommodate higher levels of water. With the proper choice of catalysts, the components react fully and absorb enough of the heat of reaction to provide an acceptable foam product. By "proper choice of catalysts" is meant the addition of a metal salt catalyst as described above. These catalyst, along with the excess heat of reaction, causes the residual isocyanate to react with itself to form very stable isocyanurate functionality. This chemical configuration has a significantly higher heat stability compared to standard polyurethane chemistry found in a 1:1 ratio, A:B, water blown foam formulation. Metal salt catalysts are commonly used in higher concentrations in foam systems where it is desirable to produce a high level of isocyanurate structure with an NCO index of 2.5 or higher rather than the normal NCO index of 1.2 or lower for polyurethane.

As shown in Table 1, Example 2 illustrates an embodiment of the present invention comprising a composition of a 2:1 volume ratio, A:B, water blown foam formulation. The foam system processed well and as can be seen, exhibited a closed cell content in excess of 90%. The foam also exhibited excellent 28 day humid age dimensional stablility properties. However, the insulation value was not as high as experienced in Example 1.

TABLE 1

| Ratio | TYPE | Example 1 1:1/A:B | TYPE | Example 2 2:1/A:B |
|---|---|---|---|---|
| Mannich Polyol (1) | R466-X | 24.00 | R350X | 21.00 |
| Polyester Polyol (2) | T305 | 37.00 | T203 or T256 | 25.00 |
| Polyether Polyol (3) | E600 or P241 | 16.00 | E600 | 40.00 |
| Total Catalysts (4) | | 2.30 | | 3.20 |
| Metal Salt Catalyst (5) | | 0.00 | | 0.40 |
| Surfactant (6) | | 1.00 | | 0.75 |
| Flame Retardant (7) | | 14.50 | | 6.50 |
| Water | | 2.25 | | 2.80 |
| HFC-134a | | 3.00 | | 0.00 |
| System NCO Index | | 1.06 | | 1.92 |
| Blend Viscosity | | 1,000 | | 500 |
| Density (lb/cuft) | | 2.7 | | 3.2 |
| II Compressive (psi) | | 35 | | 56 |
| Closed Cells (%) | | 90 | | 94 |
| K-Factor/R-Value | | 0.20/5.0 | | 0.24/4.2 |
| ASTM E-84 (9) | | 330 | | No test |

TABLE 1-continued

| Ratio | TYPE | Example 1 1:1/A:B | TYPE | Example 2 2:1/A:B |
|---|---|---|---|---|
| Humid Age (%) | | | | |
| 1 Day | | No test | | No test |
| 7 Day | | No test | | No test |
| 28 Day | | No test | | −0.24 |
| Firm Time in Min. (8) | | 2.00 | | 2.0–2.5 |
| System Relative Cost | | | | |
| HCFC-141b Base = 1.00 | | 1.00 | | No test |

(1) Various Manufacturers such as Huntsman R350X, R470X or Equivalent could be used.
(2) Various Manufacturers such as KOSA Terate 3520, 4020, 4026, Oxid Terol 352 or Equivalent could be used.
(3) Various Manufacturers of Polyoxyalkane Glycol could be used.
(4) Various Manufacturers such as Air Products Polycat 5, 8, 11, Dabco BL-11, or others could be used.
(5) Various Manufacturers such as Air Products Dabco K-15, Polycat 46, or others could be used.
(6) Various Manufacturers such as Air Products LK-443, Dabco DC-193, or others could be used.
(7) Various Manufacturers such as Great Lakes PHT-4 Diol, Akzo-Nobel Fyrol PCF, or others could be used.
(8) The time in minutes after the foam is applied that it can be walked on without breaking the foam surface or leaving indentations in the foam surface.
(9) This flamespread rating is not intended to reflect hazards presented by this or any other material under actual fire conditions.

Example 3

Referring to Table 2, Example 3 illustrates another embodiment of the present invention comprising a composition of a 1.5:1 volume ratio, A:B, water blown foam formulation. This example also includes a low level of HFC-134a as an auxiliary blowing agent. The foam system processed very well with smooth top skin and excellent interlaminar adhesion between lifts (passes) of foam. The foam properties of this example are found to be encouraging. This is especially so with respect to insulation value and fire retardant properties.

Example 4

Referring to Table 2, Example 4 illustrates another embodiment of the present invention comprising an improved composition of the 1.5:1 volume ratio, A:B, water blown foam formulation. The foam system processed very well with a smooth top skin and excellent interlaminar adhesion between lifts (passes) of foam. The physical properties show excellent compressive strength, insulation value, dimensional stability properties and flammability characteristics.

TABLE 2

| Ratio | TYPE | Example 3 1.5:1/A:B | TYPE | Example 4 1.5:1/A:B |
|---|---|---|---|---|
| Mannich Polyol (1) | R350X | 26 | R350X | 20 |
| Polyester Polyol (2) | T256 | 20.00 | T4026 or P330D | 30.00 |
| Polyether Polyol (3) | E600 | 33.00 | E600 or 241 | 32.00 |
| Amine Catalysts (4) | | 2.25 | | 1.50 |
| Metal Salt Catalyst (5) | | 0.20 | | 1.00 |
| Surfactant (6) | | 0.35 | | 0.50 |
| Flame Retardant (7) | | 14.50 | | 12.00 |
| Water | | 2.70 | | 2.50 |
| HFC-134a | | 0.50 | | 0.50 |
| System NCO Index | | 1.59 | | 1.65 |
| Blend Viscosity | | 550 | | 600 |

TABLE 2-continued

| Ratio | TYPE | Example 3 1.5:1/A:B | TYPE | Example 4 1.5:1/A:B |
|---|---|---|---|---|
| Density (lb/cuft) | | 3.4 | | 3.3 |
| II Compressive (psi) | | 51 | | 53 |
| Closed Cells (%) | | 90 | | 90 |
| K-Factor / R- Value | | 0.196/5.1 | | 0.178/5.6 |
| ASTM E-84 (9) | | 25 | | 30 |
| Humid Age (%) | | | | |
| 1 Day | | −15.0 | | −3.7 |
| 7 Day | | −12.2 | | −4.1 |
| 28 Day | | −7.7 | | −3.2 |
| Firm Time in Min. (8) | | 2.0–2.5 | | 2.0–2.5 |
| System Relative Cost | | | | |
| HCFC-141b Base = 1.00 | | Not tested | | 0.98 |

(1) Various Manufacturers such as Huntsman R350X, R470X or Equivalent could be used.
(2) Various Manufacturers such as KOSA Terate 3520, 4020, 4026, Oxid Terol 352 or Equivalent could be used.
(3) Various Manufacturers of Polyoxyalkane Glycol could be used.
(4) Various Manufacturers such as Air Products Polycat 5, 8, 11, Dabco BL-11, or others could be used.
(5) Various Manufacturers such as Air Products Dabco K-15, Polycat 46, or others could be used.
(6) Various Manufacturers such as Air Products LK-443, Dabco DC-193, or others could be used.
(7) Various Manufacturers such as Great Lakes PHT-4 Diol, Akzo-Nobel Fyrol PCF, or others could be used.
(8) The time in minutes after the foam is applied that it can be walked on without breaking the foam surface or leaving indentations in the foam surface.
(9) This flamespread rating is not intended to reflect hazards presented by this or any other material under actual fire conditions.

The formulation cost of preferred embodiments of the present invention can be comparable to that of a typical current standard HCFC-141b blown, 1:1 volume ratio foam formulation as shown in Table 3. Additionally, preferred embodiments of the present invention can be significantly lower in cost as compared to a typical HFC-245fa system formulation as shown in Table 3. Also included in Table 3 are the physical property requirements according to ASTM C1029-2002. It can be seen that the preferred embodiments of the present invention meets or exceeds these requirements.

TABLE 3

| | Typical+ Current HCFC-141b 1:1/A:B | Typical++ Current HFC-245fa 1:1/A:B | ASTM C-1029-2002 |
|---|---|---|---|
| Desity (lb/cuft) | 3.0 | 3.0 | NS* |
| II Compressive (psi) | 41 | 51 | 40 Min |
| Closed Cells (%) | 90 | NR**** | 90 Min |
| K-Factor/R-Value | 0.16/6.25 | 0.162/6.15 | TBD** |
| ASTM E-84 | 60 | 65 | Report Value+++ |
| Humid Age (%) | | | |
| 1 Day | 2.2 | Not Reported | <15 |
| 7 Day | 4.3 | Not Reported | <15 |
| 28 Day | 9.3 | Not Reported | No Spec |
| Firm Time in Min. | 3.5–4.0 | 2.5–3.0 | No Spec |
| System Relative Cost | | | |
| HCFC-141b Base = 1.00 | 1.00 | 1.26 | NA |

+From Available HCFC-141b Foam Data
++From Several Supplier Data Sheets
+++Typical Building Code Requirement is less than 75
*Not Specified, Typical is 2.5–3.5
**To Be Determined by Evaluation Report Acceptance Criteria 12

In order to properly process some embodiments of the present invention, the processing equipment is preferably modified from the standard 1:1, A:B, volume ratio to operate at a volume ratio higher in A, preferably less than 5:1, more preferably less than 2.5:1, and most preferably 1.5:1.

In one embodiment, the foam prepared from the preferred compositions are spray polyurethane roof grade foam. Preferably, the foam has an applied foam core density of less than five pounds per cubic foot, more preferably less than four pounds per cubic foot, and most preferably in the range of about 2.5 to about 3.5 pounds per cubic foot. Although this range is most preferred, persons of ordinary skill in the art will recognize that foams having lower densities are achievable using the details disclosed herein.

Additionally, foams prepared using the preferred embodiments meet the requirements of ASTM C1029-2002 including having a closed cell content of about 90%. Preferably the resulting foam has an insulation property value (R-value) greater than about 3.75. When small amounts of auxiliary blowing agent is used in the formulation the insulation value is preferably raised to at least about 5.0.

Foams resulting from various embodiments of the present invention foam forming composition are suitable for roofing, wall insulation, floatation, laminated panels or structures, void filling, prefabrication or composite structures, and insulating structures.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A composition for preparing polyurethane foam comprising:
    an A-side component comprising polyisocynate; and
    a B-side component comprising between about 10 to about 50 weight percentage of Mannich polyol, between about 10 to about 80 weight percentage of polyester polyol, between about 10 to about 50 weight percentage of polyether polyol, between about 0.05 to about 10 weight percentage of metal salt catalyst, and between about 0.75 to about 10 weight percentage of water;
    where in the volume ratio of A-side component to B-side component is between about 1.05 to about 5.

2. The composition of claim 1 wherein said Mannich polyol comprises a Mannich polyol having a functionality equal to or greater than 3.0, and a viscosity greater than 3,500 but less than 40,000 cps @ 25° C.

3. The composition of claim 2 wherein said Mannich polyol comprises a Mannich Polyol initiated from phenol, nonyl-phenol, or other phenol derivatives.

4. The composition of claim 1 where in said polyester polyol comprises a polyester polyol having a functionality equal to or greater than 2.0, and a viscosity less than 40,000 cps @ 25° C.

5. The composition of claim 4 wherein said polyester polyol comprises a polyester polyol intiated from dimethylterephthalate, pthalic anhydride, or polyethylene terephthalate.

6. The composition of claim 1 wherein said polyether polyol comprises a polyglycol polyether polyol having a functionality equal to or greater than 2.0, and a viscosity equal to or greater than 10 cps @ 25° C. but less than 100,000 cps @ 25° C.

7. The composition of claim 6 wherein said polyether polyol comprises a polyether polyol initiated from water, glycol, glycerin, sucrose, or sorbitol.

8. The composition of claim 1 further comprising an auxiliary blowing agent.

9. The composition of claim 8 wherein said auxiliary blowing agent comprises hydroflurocarbon or hydrochlorofluorocarbon.

10. The composition of claim 8 wherein said auxiliary blowing agent is selected from the group consisting essentially of: HCFC-22, HCFC-142b, HFC-134a, HFC-245fa, or HFC-365mfc.

11. The composition of claim 8 wherein said auxiliary blowing agent comprises a hydrocarbon blowing agent.

12. The composition of claim 8 wherein said auxiliary blowing agent comprises dichloroethylene.

13. The composition of claim 8 wherein said auxiliary blowing agent comprises between about 0.01 to about 10 weight percentage of said B-side component.

14. The composition of claim 8 wherein said auxiliary blowing agent comprises between about 0.1 to about 5 weight percentage of said B-side component.

15. The composition of claim 1, wherein the B-side component comprises between about 15 to about 45 weight percentage of Mannich polyol.

16. The composition of claim 1, wherein the B-side component comprises between about 20 to about 40 weight percentage of Mannich polyol.

17. The composition of claim 1, wherein the B-side component comprises between about 15 to about 75 weight percentage of polyester polyol.

18. The composition of claim 1, wherein the B-side component comprises between about 20 to about 40 weight percentage of polyester polyol.

19. The composition of claim 1, wherein the B-side component comprises between about 15 to about 45 weight percentage of polyether polyol.

20. The composition of claim 1 wherein the B-side component comprises between about 20 to about 40 weight percentage of polyether polyol.

21. The composition of claim 1 wherein the B-side component comprises between about 15 to about 45 weight percentage of Mannich polyol, between about 15 to about 75 weight percentage of polyester polyol, and between about 15 to about 45 weight percentage of polyether polyol.

22. The composition of claim 1 wherein the B-side component comprises between about 20 to about 40 weight percentage of Mannich polyol, between about 20 to about 40 weight percentage of polyester polyol, and between about 20 to about 40 weight percentage of polyether polyol.

23. The composition of claim 1 wherein the volume ratio of A-side component to B-side component is between about 1.2:1 and about 2.5:1.

24. The composition of claim 1 wherein the volume ratio of A-side component to B-side component is between about 1.2:1 and about 1.5:1.

25. The composition of claim 1 wherein said B-side component further comprising between about 1 to about 5 weight percentage of amine catalysts.

26. The composition of claim 1 wherein said B-side component further comprising between about 5 to about 20 weight percentage of flame retardant.

27. The composition of claim 1 wherein said B-side component further comprising between about 0.25 to about 3.0 weight percentage of surfactant.

28. The composition of claim 1 wherein said polyisocyanate comprises polymeric methylene diphenyl disocyanate.

29. The composition of claim 1 wherein said polyisocyanate comprises isocyanate prepolymer.

30. The composition of claim 1 wherein the metal salt catalyst comprises alkai metal salts of organic acids.

31. The composition of claim 30 wherein the metal salt catalyst comprises sodium salt.

32. The composition of claim 30 wherein the metal salt catalyst comprises potassium salt.

33. The composition of claim 1 wherein water comprises between about 1.0 to about 6.0 weight percentage of B-side component.

34. The composition of claim 1 wherein water comprises between about 2.0 to about 4.0 weight percentage of B-side component.

35. A polyurethane foam comprising the reaction product of:
an A-side component comprising polyisocyanate; and
a B-side component comprising between about 20 to about 40 weight percentage of Mannich polyol, between about 20 to about 40 weight percentage of polyester polyol, between about 20 to about 40 weight percentage of polyether polyol, between about 0.05 to about 10 weight percentage of metal salt catalyst, and between about 2.0 to about 4.0 weight percentage of water;
where in the volume ratio of A-side component to B-side component is between about 1.2:1 to about 2.0:1.

36. A polyurethane foam comprising the reaction product of:
an A-side component comprising polyisocyanate; and
a B-side component comprising between about 10 to about 50 weight percentage of Mannich polyol, between about 10 to about 80 weight percentage of polyester polyol, between about 10 to about 50 weight percentage of polyether polyol, between about 0.05 to about 10 weight percentage of metal salt catalyst, and between about 0.75 to about 10 weight percentage of water;
where in the volume ratio of A-side component to B-side component is between about 1.05 to about 5.

37. The foam of claim 36 wherein said foam has an insulation property (R-valve) greater than about 3.75.

38. The foam of claim 36 wherein said foam meets the requirements of ASTM C1029-2002.

39. The foam of claim 36 wherein said B-side component of the reaction further comprises auxiliary blowing agent and said foam has an insulation property value greater than about 5.0.

40. The foam of claim 36 wherein said foam comprises a closed cell content equal to or greater than about 90%.

41. A method of applying a polyurethane foam comprising the steps of:
providing an A-side component comprising polyisocaynate and a B-side component comprising between about 10 to about 50 weight percentage of Mannich polyol, between about 10 to about 80 weight percentage of polyester polyol, between about 10 to about 50 weight percentage of polyether polyol, between about 0.05 to about 10 weight percentage of metal salt catalyst, and between about 0.75 to about 10 weight percentage of water; where in the volume ratio of A-side component to B-side component is between about 1.05 to about 5;

preparing a surface on which to apply the foam;

reacting the A-side and B-side components; and applying the reacting components to a surface.

42. The method of claim 41 wherein said surface comprises a roof.

43. The method of claim 41 wherein said surface comprises a structural wall.

44. The method of claim 41 wherein said surface comprises an exterior surface.

45. The method of claim 41 wherein said surface comprises an interior surface.

46. The method of claim 41 wherein said surface comprises a storage tank.

47. The method of claim 41 wherein said surface comprises an insulated cavity.

48. The method of claim 41 wherein said surface comprises a process vessel.

* * * * *